United States Patent Office 3,614,838
Patented Oct. 26, 1971

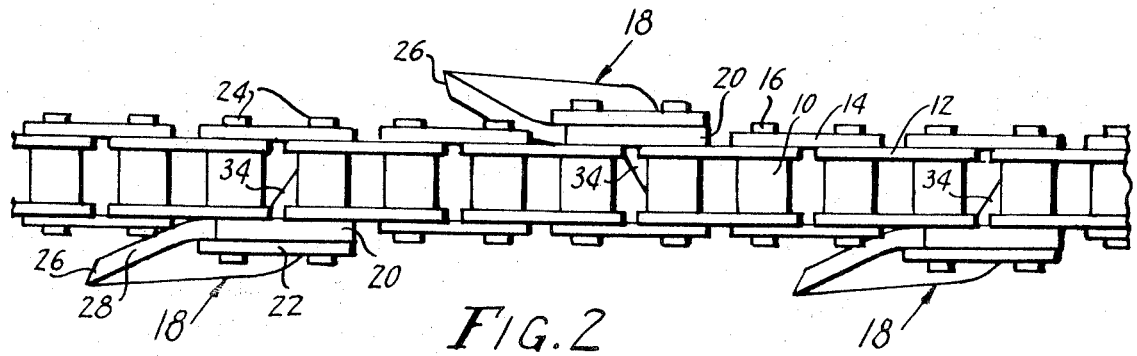
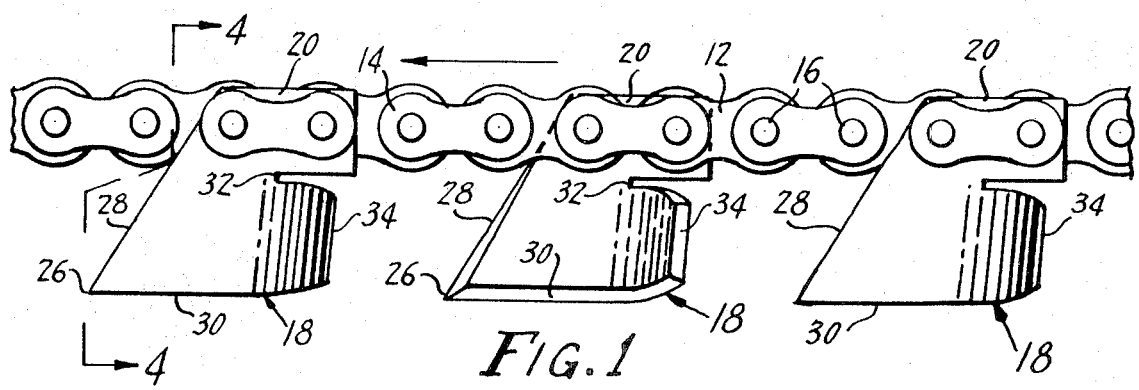
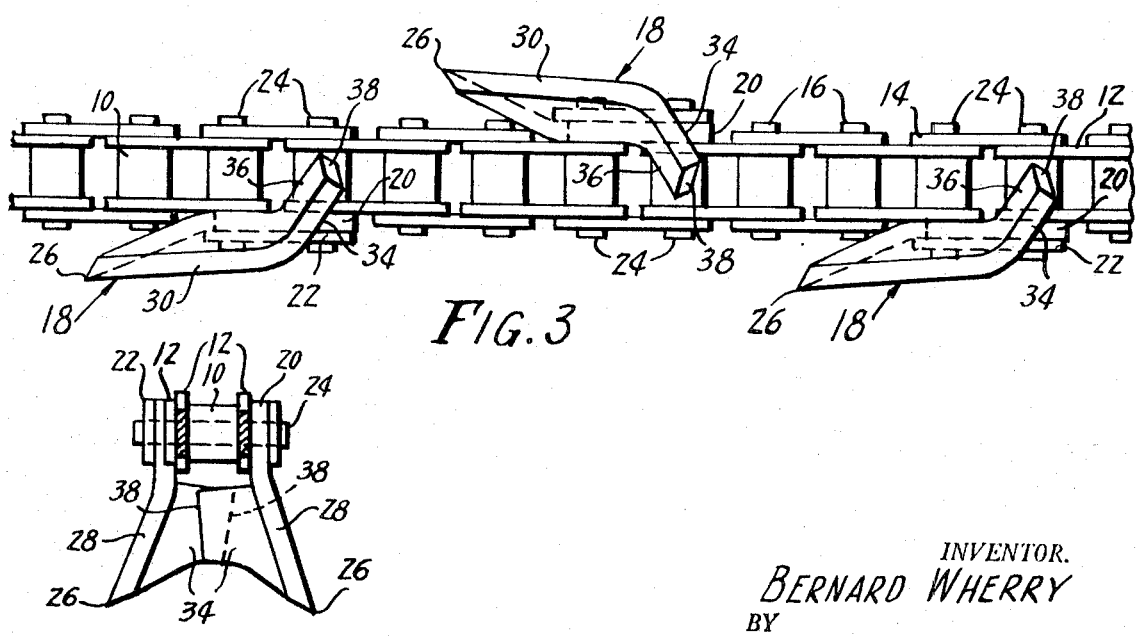

3,614,838
TREE DIGGING CHAIN SAW
Bernard Wherry, St. Marys, W. Va. 26170
Filed Apr. 4, 1969, Ser. No. 813,498
Int. Cl. E02f *3/08;* B27b *33/14, 33/02*
U.S. Cl. 37—191
2 Claims

ABSTRACT OF THE DISCLOSURE

A conventional saw chain, for example, a link and roller chain, is provided with cutting teeth alternately arranged on opposite sides of the saw and provided with forwardly and outwardly angled teeth to cut downwardly through the ground to form a ditch around a tree or bush to facilitate the digging of the tree or bush with a substantial ball of earth thereon. Each tooth is provided with a rearwardly inwardly angled extension, with the paths of travel of alternate extensions overlapping each other so as to dig a ditch across the width of the chain as well as outwardly beyond the chain.

BACKGROUND OF THE INVENTION

As is well known, bushes and trees at nurseries are sold with a ball of earth attached thereto in which the plants are rooted. It is necessary, under present practice, to manually dig a ditch around the plant for the detachment of the ball of earth from the ground so that it can be lifted and usually wrapped in a burlap bag for sale and shipment. This is very laborious work and extremely time-consuming, as a result of which the labor of digging a tree or bush adds to the cost thereof and frequently slows down deliveries of the nursery stock.

SUMMARY OF THE INVENTION

A chain saw is provided, the chain of which is conventionally mounted to pass around top and bottom sprockets and power-driven. The chain is inserted in the ground and a circular ditch cut around the nursery stock to facilitate the separation from the surrounding ground of the ball of earth which it is desired to dig. The chain itself may be conventional. A highly novel type of teeth is employed for cutting the ditch. These teeth are secured to links of the chain on alternate sides thereof and in longitudinally spaced relation. Each tooth has at the bottom thereof a forwardly extending digging point inclined forwardly and outwardly from the chain and as the chain is driven, these digging points excavate most of the ditch and determine the transverse limits of the width thereof. Since the chain lies between the digging points, it is necessary also to cut loose the earth beneath and within the lateral limits of the chain. To this end, each tooth is provided with a projection rearwardly of the forward cutting point, and this projection turns inwardly at an angle to extend partially across the chain, and preferably more than half way across the width of the chain. Since the alternate teeth have their projections extending across the chain from opposite sides thereof, the free end of each rear projection overlaps the path of travel of the next forward projection. Accordingly, the cutting points and rear projections completely cut through the ground across the width of the chain and to the lateral limits defined by the forwardly projecting cutting points. The saw thus progresses around a bush or tree and will readily cut downwardly into the earth for the required depth for the loosening and removal of the ball of earth.

BRIEF DESCRIPTION OF THE DRAWING

FIG. 1 is a side elevation showing a section of the chain carrying the invention;

FIG. 2 is a top plan view of the same;

FIG. 3 is a bottom plan view of the same; and

FIG. 4 is a transverse section on line 4—4 of FIG. 1.

DESCRIPTION OF THE PREFERRED EMBODIMENT

The chain of the present invention may be conventional and forms per se no part of the present invention. This chain preferably is of the type employing transverse rollers 10 and alternate pairs of rollers are connected by inner links 12 and outer links 14, having their ends overlying the inner links, the overlapping ends of the links being connected to the rollers by fastening elements 16, such as rivets, passing through the rollers.

The device forming the principal subject matter of the present invention comprises a plurality of cutter teeth each of which is indicated as a whole by the numeral 18. As shown in FIGS. 2 and 3, adjacent cutters are longitudinally spaced along the chain and arranged at alternate sides thereof. Each tooth includes an upper straight longitudinal body portion 20 which takes the place of the outer link 14 normally employed. Each body 20 has a link 22 similar to each of the links 14. Rivets or other fastening elements 24 pass through each body 20 and through the adjacent conventional links and the rollers 10 arranged therebetween.

Each cutting tooth 18 is provided with a forward cutting point 26, the forward edge 28 of which slopes downwardly and forwardly as shown in FIG. 1, and is angled outwardly relative to the chain as shown in FIG. 2. The width of the ditch to be cut around the plant obviously will correspond to the transverse width defined by the opposite cutting points 26. The bottom edge of each tooth 18 may be horizontal or slightly rearwardly inclined upwardly as at 30 (FIG. 1). The body 20 of each tooth is slotted from the rear end toward the forward end as at 32 to form a projection 34. Each of these projections is slightly canted as at 36 relative to the chain and extends partially across the width of the chain therebelow. Actually, each projection 34 has its free extremity 38 extending past a line centrally of the width of the chain so that the paths of travel of successive projections 34 overlap each other. The relative overlapping of the projections 34 will be apparent from an examination of FIG. 4 from which it is clear that the free ends 38 of these projections extend beyond the center line of the chain.

OPERATION

As previously stated, the apparatus is operable in much the same manner as a conventional chain saw, an endless chain passing around vertically spaced sprockets one of which will be power-driven by a suitable motor or engine through a conventional reducing gear. The particular mounting of the chain in the manner stated is of no importance so far as the present invention is concerned, and any chain mounting may be used and the chain may be driven in any suitable manner.

With the chain in operation, the lower of the two spockets is moved into proximity to the ground at a proper distance from a plant or tree to be dug. The saw is advanced in a circle around the sock to progressively dig a ditch therearound. The width of this ditch will correspond to the distance between the two cutting points 26 in FIG. 4, these points obviously defining the lateral width of the ditch. The digging is continued to progressively greater depths in the earth, and it will be apparent that the rear projections 34 clear the dirt beneath the chain, since this chain must progressively move downwardly into the ditch as it is dug. As previously stated, the projections 34 preferably extend over half-way across the width of the chain so that the projections of alternate teeth overlap each other. It is not essential that the projections overlap to the extent shown in FIG. 4, since it is sufficient in most cases for the projections to extend half-way across the width of the chain, or almost half-way across, since any soil in a gap between the end surfaces 38 will be suitably loosened. It is preferred, however, that the overlapping relationship of the projections 34 be employed since the saw has been found to work most efficiently with this arrangement of parts.

The digging in the manner described may be carried out with much greater speed than is done at present by the manual digging of nursery stock to secure a ball of earth around the roots. After digging has been carried out to a suitable extent, the saw is removed and the ball of dirt loosened at the bottom in the usual manner and removed together with the nursery stock, which is usually wrapped in burlap for sale and shipment.

Since the present apparatus functions much more rapidly than the conventional digging of nursery stock, it follows that an important saving in cost is effected in the digging of the stock. Moreover, the production rate is increased, thus helping to prevent delays in shipping orders, particularly for a number of bushes or trees. The cutting action is so powerful that the teeth will cut through roots and even through limestone.

The outward angling of the forward cutting points facilitates the digging operation, and this, together with the rearward sloping of the projections 34 tends to maintain the teeth clean so that the digging operation can progress rapidly.

From the foregoing it will now be seen that there is herein provided an improved tree digging chain saw which accomplishes all of the objects of this invention and others, including many advantages of great practical utility and commercial importance.

As various embodiments may be made of this inventive concept, and as many modifications may be made in the embodiment hereinbefore shown and described, it is to be understood that all matter herein is to be interpreted merely as illustrative, and not in a limiting sense.

I claim:
1. An earth cutting chain saw comprising a link chain and a series of cutting teeth alternately secured against opposite sides of said chain in longitudinal spaced relation, the top securing portion of each cutting tooth being in a plane parallel with the side of said chain, each cutting tooth having a first bottom cutting portion extending outwardly from said securing portion and the side of said chain at an acute angle with said plane, the cutting edge of said first bottom cutting portion sloping downwardly forming a vertex having an acute angle with the bottom perimeter of said first bottom cutting portion for digging a ditch having a wall greater than the distance between the opposite sides of said chain with said vertex being the farthest point of said first bottom cutting portion from both the side and horizontal planes of said chain.

2. The chain saw of claim 1, wherein each cutting tooth has a second bottom cutting portion spaced from said top securing portion and extending outwardly toward the side of said chain opposite the side to which said securing portion is secured from the plane of said first bottom cutting portion at an acute angle therewith to an extent where the ends of successive said second bottom cutting portions overlap each other for digging dirt directly below said chain.

References Cited
UNITED STATES PATENTS

| | | | |
|---|---|---|---|
| 1,745,090 | 1/1930 | Geithle | 37—191 |
| 2,519,076 | 8/1950 | Schmidt | 37—191 |
| 2,708,798 | 5/1955 | Warner et al. | 37—86 |
| 2,709,860 | 6/1955 | Helton | 37—191 |
| 2,817,167 | 12/1957 | Barber | 37—86 |
| 2,946,142 | 7/1960 | Swanson | 37—80 |
| 3,050,881 | 8/1962 | Brown | 37—86 |
| 3,104,481 | 9/1963 | George et al. | 37—191 |
| 3,469,610 | 9/1969 | Silvon | 143—135 |

ROBERT E. PULFREY, Primary Examiner

C. D. CROWDER, Assistant Examiner

U.S. Cl. X.R.

143—135, 141; 37—142, 2